United States Patent
Pardikar et al.

(10) Patent No.: US 7,437,429 B2
(45) Date of Patent: Oct. 14, 2008

(54) SYSTEM AND METHOD FOR PROVIDING TRANSPARENT ACCESS TO DISTRIBUTED AUTHORING AND VERSIONING FILES INCLUDING ENCRYPTED FILES

(75) Inventors: Shishir Pardikar, Redmond, WA (US); Rohan Kumar, Seattle, WA (US); Yun Lin, Kirkland, WA (US); Praerit Garg, Bellevue, WA (US); Jianrong Gu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 10/052,039

(22) Filed: Jan. 17, 2002

(65) Prior Publication Data

US 2003/0046366 A1 Mar. 6, 2003

Related U.S. Application Data

(60) Provisional application No. 60/268,311, filed on Feb. 13, 2001.

(51) Int. Cl.
*G06F 15/16* (2006.01)
*G06F 12/00* (2006.01)

(52) U.S. Cl. ................ 709/219; 709/203; 707/203

(58) Field of Classification Search ........... 709/219, 709/203; 707/203
See application file for complete search history.

(56) References Cited

U.S. PATENT DOCUMENTS

| | | | |
|---|---|---|---|
| 5,341,499 A * | 8/1994 | Doragh | 719/321 |
| 5,918,228 A | 6/1999 | Rich et al. | |
| 6,185,681 B1 | 2/2001 | Zizzi | |
| 6,249,866 B1 | 6/2001 | Brundrett et al. | 713/165 |
| 6,578,069 B1 * | 6/2003 | Hopmann et al. | 709/203 |
| 6,629,127 B1 * | 9/2003 | Deen et al. | 709/203 |

(Continued)

FOREIGN PATENT DOCUMENTS

WO    WO 96/29663    9/1996

(Continued)

OTHER PUBLICATIONS

McCracken, Harry, "Online Storage: the Next Generation", PC World, vol. 18, No. 10, pp. 45-49, Oct. 1, 2000.

(Continued)

*Primary Examiner*—William C. Vaughn, Jr.
*Assistant Examiner*—Ranodhi N Serrao
(74) *Attorney, Agent, or Firm*—Workman Nydegger

(57) ABSTRACT

Access to WebDAV (Distributed Authoring and Versioning) servers is provided in a manner that is essentially transparent to applications. A WebDAV redirector and related components support file system I/O requests and network requests directed to WebDAV servers identified by URI (Universal Resource Identifier) names, or by a drive may be mapped to a WebDAV share. An application's create or open I/O requests directed to a WebDAV server are detected, and result in a local copy of the file being downloaded and cached for local access. When closed, the local file is uploaded to the WebDAV server. Network-related requests such as for browsing that are directed to a WebDAV server are also handled transparently. WebDAV files may be locally encrypted and decrypted at the file system level, transparent to applications and the WebDAV server, via an encrypting file system that performs local encryption and decryption at the local file system level.

40 Claims, 8 Drawing Sheets

U.S. PATENT DOCUMENTS

| | | | | |
|---|---|---|---|---|
| 6,654,794 | B1* | 11/2003 | French | 709/217 |
| 6,704,871 | B1 | 3/2004 | Kaplan et al. | 713/192 |
| 6,714,968 | B1* | 3/2004 | Prust | 709/219 |
| 6,732,361 | B1* | 5/2004 | Andreoli et al. | 719/313 |
| 6,735,631 | B1* | 5/2004 | Oehrke et al. | 709/226 |
| 6,760,886 | B1* | 7/2004 | Nadon et al. | 715/500.1 |
| 6,842,770 | B1* | 1/2005 | Serlet et al. | 709/203 |
| 2002/0078432 | A1* | 6/2002 | Charisius et al. | 717/102 |
| 2002/0168616 | A1* | 11/2002 | Chan et al. | 434/118 |

FOREIGN PATENT DOCUMENTS

| | | |
|---|---|---|
| WO | WO 97/28623 | 8/1997 |
| WO | WO 99/14652 | 3/1999 |

OTHER PUBLICATIONS

Simon, Barry, "Internet Hard Drive-Out-of-the-box Experiment", PC Magazine, vol. 19, No. 9, pp. 199-200. May 9, 2000.

Brown et al., "File Access without a PC", PC Magazine, vol. 19, p. 57. May 9, 2000.

Lynch, Jim, "In Store on the Web?", PC Magazine, vol. 19, No. 6, pp. 75-76. Mar. 21, 2000.

Wildstrom, Stephen, "Put Your Files in (Free) Storage?- Having Some Space on the Web Can Be Useful-But Not for Anything Private", Business Week, No. 3672, p. 22. Mar. 13, 2000.

Armstrong, Larry, "Park Your Files on the Net", Business Week, No. 3668, p. 146. Feb. 14, 2000.

McDonald, Glenn, "Visto Briefcase: Store Files on the Web", PC World, vol. 16, No. 2, p. 108. Feb. 1, 1998.

Gustavson, Ron, "Microsoft Windows NT 4.0 Server", EMedia Professional, vol. 10, No. 11 pp. 104-106. Nov. 1, 1997.

Coates, Josh, "Internet Storage Boosts Websites", Network World, p. 37. May. 21, 2001.

Conner, Deni, "WebFS Lets Users Share Distributed Files", Network World, p. 19. Jan. 8, 2001.

Crouch, Cameron, "The Web as a Network Drive", Network World, Aug. 11, 1999.

Fontana, John, "Exchange Tackles More the Messaging", Network World, p. 44. Jun. 28, 1999.

Anonymous, Copy of International Search Report in Corresponding EP Application No. EP 02 00 3371, Jun. 6, 2003.

Eckert, Claudia; Erhard, Florian; and Geiger, Johannes. "GSFS-A New Group-Aware Cryptographic File System." *Technische Universitat Munchen, Department of Computer Science.* p. 221-230. Aug. 2000. XP009002549.

Whitehead, E.J. Jr., et al., "WebDAV: IETF Standard for Collaborative Authoring on the Web", IEEE Internet Computing, vol. 2, No. 5, Sep. 1998, pp. 34-40.

Whitehead, E.J. Jr., et al., "A Network Protocol for Remote Collaborative Authoring on the Web", European Computer Supported Cooperative Work Conference, 1999.

"Client Application for Integrating a Development Environment with a Web Distributed Authoring (WebDAV) Server", Research Disclosure, Kenneth Mason Publications, No. 420, Apr. 1999, pp. 578-579.

Partial European Search Report with Mailing Date of Jun. 26, 2002.

* cited by examiner

SYSTEM AND METHOD FOR PROVIDING TRANSPARENT ACCESS TO DISTRIBUTED AUTHORING AND VERSIONING FILES INCLUDING ENCRYPTED FILES

CROSS-REFERENCE TO RELATED APPLICATION

The present invention claims priority to U.S. Provisional Patent Application Ser. No. 60/268,311 filed Feb. 13, 2001.

FIELD OF THE INVENTION

The present invention relates generally to computers and the Internet, and more particularly to Internet Distributed Authoring and Versioning.

BACKGROUND OF THE INVENTION

The use of online storage services for storing and sharing data is becoming more popular. In general, most contemporary access to Internet storage is based on relatively complicated protocols such as FTP (File Transfer Protocol) that require specific application support.

WebDAV, or simply DAV, (Distributed Authoring and Versioning), is a protocol described in Extensible Markup Language (XML) that extends HTTP (HyperText Transfer Protocol) essentially so that Internet content and the like can be manipulated. For example, although HTTP allows content to be written using the PUT and POST verbs, WebDAV allows querying and manipulation of metadata on the files, using verbs like PROPFIND and PROPPATCH, and LOCKing of files, which along with the HTTP verbs like PUT and POST, allow document manipulation. Intermediate programs have been written to simplify the use of these protocols. For example, Microsoft Corporation's Windows® 95, Windows® 98, and Windows® 2000 operating systems provide "Web Folders," which act as interfaces to a collection of resources stored on a DAV server. Web Folders appear similar to local file folders, e.g., files can be dragged and dropped into a representation of a Web Folder, and so forth. However, Web Folders cannot be used with a non-modified application program, and only applications that have their code integrated with Web Folders can utilize Web Folders.

Alternatively, a few applications are DAV-aware and are able to work with files on WebDAV servers, such as files appearing in Web Folders. However, such applications require specific support of the protocols to access the data on the Internet, and are generally limited to a few special web authoring tools. The majority of applications, including applications already in existence, are not capable of accessing WebDAV server files, and it is virtually impossible to retroactively adapt such existing application to do so.

SUMMARY OF THE INVENTION

Briefly, the present invention provides a system and method that automatically and transparently handle WebDAV file access, whereby applications (including WebDAV unaware applications) can access WebDAV files through conventional file system-directed API (application programming interface) calls or the like. Applications can also issue network-related requests to WebDAV servers, such as for browsing, with those requests transparently handled as if a WebDAV share was a local folder.

To this end, the present invention comprises a WebDAV redirector and related components that receive requests directed to a WebDAV server, and take actions to handle the request locally or remotely as appropriate. For example, the WebDAV redirector and related components support I/O requests and network requests directed to WebDAV servers identified by URI (Universal Resource Identifier) names, or by a drive that may be mapped to a WebDAV share.

To this end, the redirector components operate to determine whether an application's create or open I/O request is directed to a WebDAV server that is connected and operating, and if so, whether a specified share and file on that server are accessible. If so, the redirector informs a multiple UNC provider that it can handle the request, and a local copy of the file is downloaded and cached for local I/O access, whereby reads and writes to the WebDAV server are made from and to the cached file. When closed, the local file is uploaded to the WebDAV server if it has been modified on the client.

Network-related requests that are directed to a WebDAV server, such requests as related to browsing, are also handled transparently by acting on API calls or the like corresponding to the request. For example, an API call to enumerate a WebDAV share is provided to the WebDAV redirector components, which determine whether the server and share is valid, and if so, inform a multiple provider router that the request can be handled. Network communications are controlled by the WebDAV redirector components to handle the request.

WebDAV files may be locally encrypted and decrypted at the file system level, transparent to applications and the WebDAV server. An encrypting file system performs local encryption and decryption at the local file system level, whereby the files cannot be viewed at the WebDAV server, and the WebDAV server need not be burdened with encryption or decryption processing.

Other advantages will become apparent from the following detailed description when taken in conjunction with the drawings, in which:

DETAILED DESCRIPTION

Exemplary Operating Environment

Figure 1:
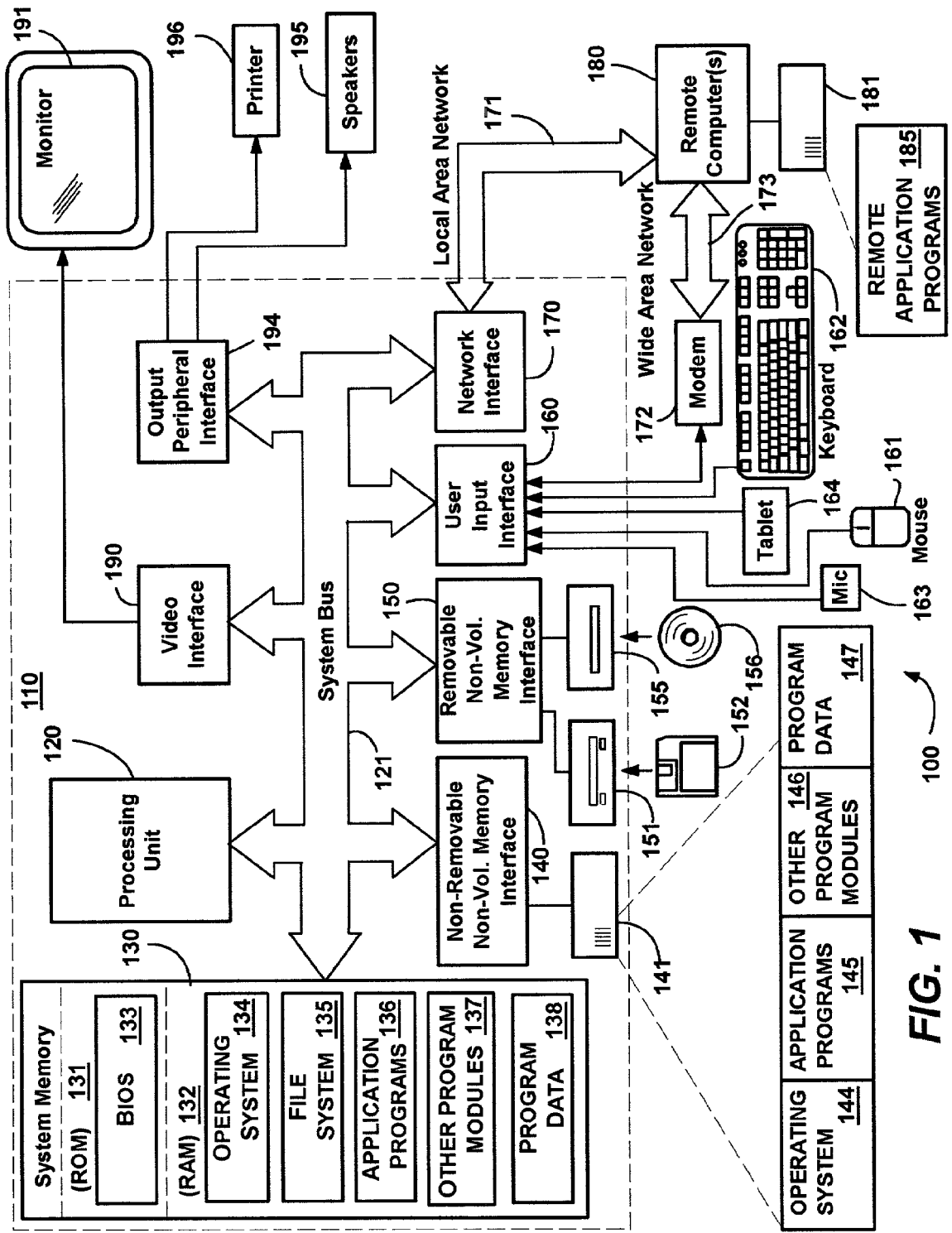
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in other transport mechanisms and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137 and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

WebDAV Redirector

The present invention will be generally described in the context of Microsoft Corporation's Windows® XP operating system, using the NTFS file system. Notwithstanding, it can be readily appreciated that the present invention may be implemented with virtually any operating system and/or file system.

Figure 2:
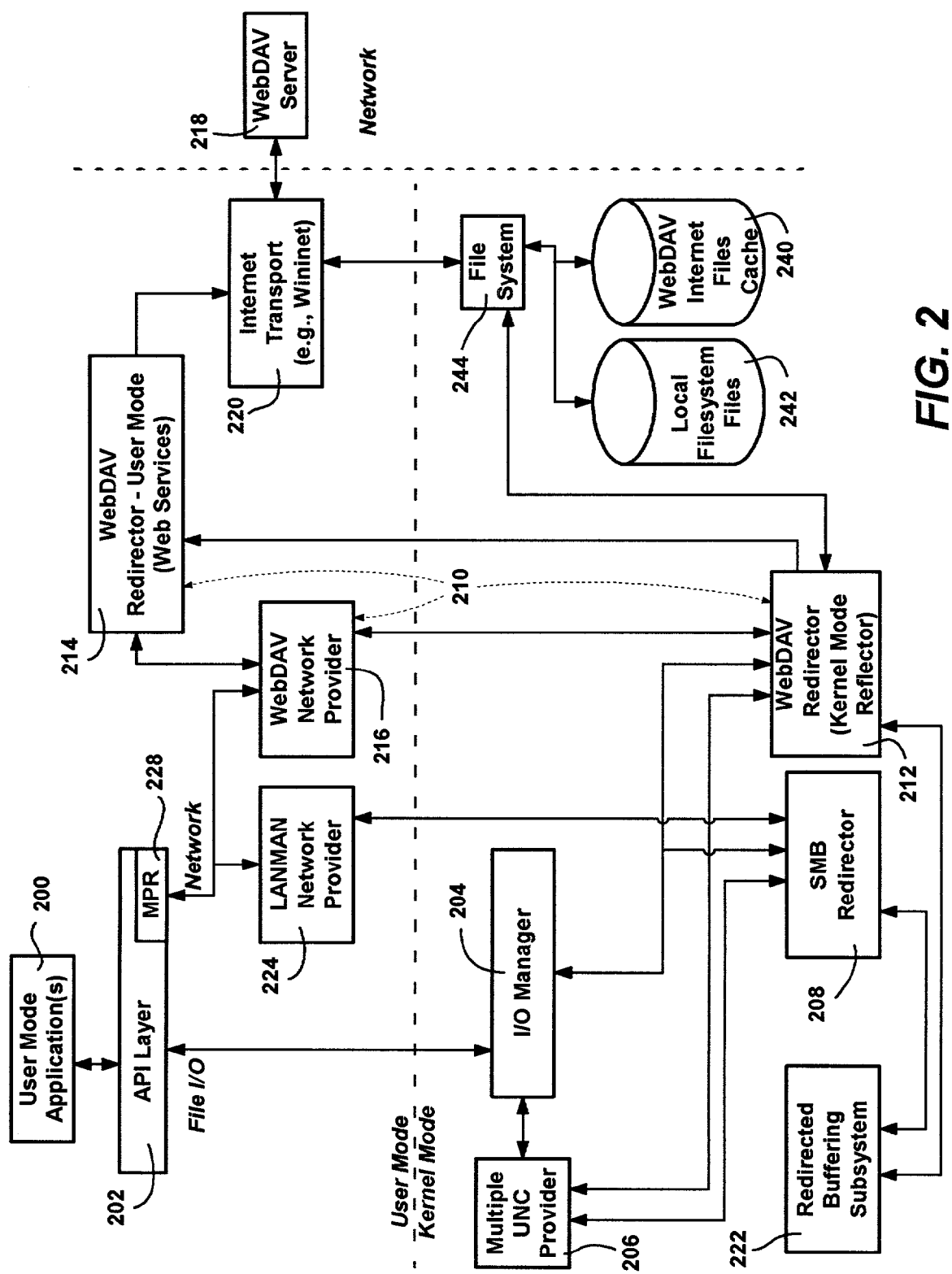
FIG. 2 is a block diagram generally representing components for implementing aspects of WebDAV redirection in accordance with the present invention.

Turning to FIG. 2 of the drawings, there is shown a user mode application program 200, which requests various system functions by calling application programming interfaces (APIs) 202. For accessing network resources, the application 200 can generally operate in at least one of two ways, a first of which is by placing file input output (I/O) API calls directed to a network resource to an API layer 202. For example, applications can examine or access resources on remote systems by using a UNC (Uniform Naming Convention) standard with Win32 functions to directly address a remote resource, e.g., in the form \\server\share, or via a drive mapped to a network shared folder or the like. Another way an application can access network resources is by calling networking APIs, (e.g., Win32 Windows Networking (WNet) APIs in the Windows® 2000 operating system), such as to enumerate a server's files when browsing. Via these WNet APIS, applicants can enumerate computers and resources that computers export for sharing.

When a file I/O API (e.g., a file open or create request) is called with a remote filename such as a UNC name, a file I/O request is received at an I/O manager 204. To handle the remote name, the I/O manager 204 calls a Multiple UNC Provider, or MUP 206 to figure out which device handles the name. In other words, the MUP 206 (e.g., comprising a kernel mode driver) determines which network to access when an application 200 uses an I/O API to open a remote file.

More particularly, to determine a device that can handle the given name, the MUP 206 polls (via asynchronous I/O request packets, or IRPs) any redirectors that have previously registered with the MUP, e.g., redirectors 208 and 212 in FIG. 2. Each redirector that can handle the name responds back, and if more than one respond, the MUP 206 determines from a priority order (e.g., maintained in at least one system registry key or the like) which one has precedence to handle the request. In one implementation, the SMB (server message block) redirector 208 defaults to having first precedence in handling UNC requests. The SMB redirector, along with IRPs and the I/O manager are generally described in the reference, *Inside Microsoft® Windows®* 2000, Third Edition, D. Solomon and M. Russinovich, Microsoft Press (2000).

As part of the response to the MUP 206, each redirector that recognizes the name indicates how much of the name is unique to it. For example, if the name is the UNC name \\SERVER\SHARE\foo\bar1.doc, the SMB (Server Message Block) redirector 208 recognizes the name as capable of being handled, and if the server is an SMB server, responds by claiming the string "\\SERVER\SHARE" as its own.

When at least one redirector responds and provides the caching information, the MUP driver 206 caches the information in association with the redirector that responded, (if more than one, it caches the information of the one that takes precedence), whereby further requests beginning with that string are sent directly to that redirector, without the polling operation. For example, future SMB requests directed to a network share corresponding to a cached string are passed to the SMB redirector 208, which then packages those SMB requests into a data structure that can be sent across the network to that remote SMB server. Note that if inactive for too long, the string information will expire in the cache, whereby polling will again be necessary.

In accordance with one aspect of the present invention, access to WebDAV servers is provided to applications in a manner that is essentially transparent to the applications. To this end, a WebDAV redirector 210 is provided that supports file system I/O and network commands directed to WebDAV servers identified by URI (Universal Resource Identifier) names. In a described implementation corresponding to that represented in FIG. 2, the WebDAV redirector 210 comprises a kernel mode redirector reflector component 212, a user mode redirector (web client service) component 214, and a user mode network provider 216. The general operation and structure of these components are described below.

In general, a WebDAV URI name has the following syntax, (with bracketed parts being optional):

http://hostname[:port][/path] or
https://hostname[:port][/path]

where path=rootdir/ . . . and rootdir comprises a virtual or physical directory exposed by an IIS WebDAV server 218. In keeping with the present invention, when the I/O manager 204 first receives such a URI name, the I/O manager 204 contacts the MUP 206, which provides the name to the various redirectors in the above-described manner, including the WebDAV kernel mode redirector component 212, which is configured to support URI names, as described below. Note that to be compatible with all the existing applications that use Win32 file I/O, the WebDAV redirector component 212 also supports UNC names.

In the present example, because the request is a URI name, the WebDAV kernel redirector 212 will be the only redirector that responds, (or otherwise has precedence), provided the URI name identifies an actual, accessible WebDAV server, as described below. The response will indicate to the MUP 206 that the WebDAV kernel redirector 212 is capable of handling file I/O requests directed to that share, and provide the information necessary to bypass the polling operation for subsequent requests directed to that share.

In this manner, once its information is cached at the MUP 206, each I/O request directed to that WebDAV share will be sent to the WebDAV kernel mode component 212 of the WebDAV redirector 210, which will attempt to satisfy it, (e.g., locally, as described below). If the WebDAV redirector kernel mode component 212 cannot satisfy an I/O request locally by calling the underlying file system, then the WebDAV redirector reflects the request up to the user mode WebDAV redirector component 214, which implements a WebDAV client and attempts to complete the request via an Internet transport component 220 (e.g., WinInet APIs) and WebDAV server 218. The user mode WebDAV redirector component 214 returns the control and any WebDAV server's response back to the WebDAV kernel mode redirector 212. In this manner, file I/O requests directed to a WebDAV server will be handled by the WebDAV redirector 210, whereby the application 200 will have transparent access (e.g., if they were on a local or SMB network drive) to those files. WebDAV file I/O requests are described below with respect to the flow diagrams of FIGS. 3-7. Note that for completeness, FIG. 2 represents each kernel mode redirector 208 and 212 connected to a Re-Directed Buffering Subsystem 222, or RDBSS, which comprises a remote file system component that supports multiple file level protocols by providing common buffering code for the kernel mode redirectors, including the SMB redirector 208 and the WebDAV redirector 212.

In the other, networking API alternative for accessing remote resources mentioned above, an application 200 calls networking (e.g., WNet) APIs, which among other functions allow applications to connect to network resources, such as file servers and printers, and to browse the contents of any type of remote file system. Because a networking API can be called to work across different networks using different transport protocols, when one of these networking APIs are called, a corresponding network provider (e.g., network provider 216 or 224) is used to send the request correctly over the network and to understand the results that the remote server returns.

In general, a network provider comprises software code that establishes the operating system as a client of a remote network server. For example, some of the operations a network provider performs include making and breaking network connections, printing remotely, and transferring data. Thus, and as is known, typical functions provided by a network provider include capabilities functions, which allow the caller to determine the capabilities of the network provider, user name functions, which prompts the network provider for the user name associated with a connection, and device redirecting functions, which allow a network provider to redirect drive letters, (described below), MS-DOS® devices, and LPT ports. Other functions include provider-specific dialog functions, which allow a network provider to display or act on network-specific information, administrative functions, which allow a network provider to display or act on special network directories, and enumeration functions, which allow browsing of network resources.

To determine which network provider to call when an application calls a networking routine of the APIs 204, in one implementation, the call passes to a multiple network provider router, or MPR 228, which may be installed as a Dynamic Link Library (DLL). Similar to the MUP 206, the MPR 228 determines which user mode network provider recognizes the resource being accessed. To this end, each installed network provider beneath the MPR 228 supplies a set of functions collectively called a network provider interface that allows the MPR 228 to determine which network the application is trying to access, and to direct the request to the appropriate network provider software. For example, the network provider of the SMB-mini redirector 208 is a LANMAN (local area network manager) network provider 224 as specified in a system registry key or the like. The network provider of the WebDAV redirector 210 is a WebDAV network provider 216, also specified in a system registry key or the like.

In a described implementation, when called to connect to a remote network resource, the MPR 228 checks the registry to determine which network providers are loaded. The MPR 228 then polls them, one at a time, in the order in which they are listed in the registry, (which is configurable), and each network provider communicates with its corresponding redirector until the resource is recognized or until all available network providers have been polled. Thus, in the event of a networking API call that is directed (e.g., via a URI passed as a call parameter) to the WebDAV server 218, the MPR will poll the WebDAV network provider 216, which in turn call via RPC (remote procedure call) into the Web Service 214 which will contact the kernel mode WebDAV redirector 212 to determine if the API can be handled, e.g., if the specified WebDAV share is indeed an accessible WebDAV server. If so, the API is handled by the WebDAV redirector components 210.

Another way in which applications can transparently access network resources is via a drive letter or device name previously mapped (e.g., via a networking API such as WnetAddConnection) to that resource. To this end, when called, the API routes the call to the appropriate network provider, e.g., via polling as described above. The responsive network provider, in turn, creates a symbolic-link object in an object manager namespace that maps the drive letter being defined to its associated redirector for that network. Once mapped, when the WNet or other API calls to open a resource on a different network, the I/O manager (in conjunction with an object manager, not shown) locates the redirector that handles the request. In keeping with the present invention, a user can thus map a drive to a WebDAV URI, such as by using the shell to call the WnetAddConnection API function, and once the drive is mapped in the object manager's namespace, applications can access files on a WebDAV server 212 via the drive letter, as the I/O system will handle the mapping of the letter to the correct URI.

In general, although essentially transparent to applications, a user may interact with WebDAV functionality of the present invention via a system command window, wherein a "net" command will provide character user interface for WebDAV redirection, e.g. "NET USE*HTTP:// . . . ", by mapping a network drive, adding a network place, creating shortcuts, opening files, interfacing with a browser Address Bar, and typing via a "Start"-"Run" interface or the like. As is understood, other mechanisms that deal with networks may also lead to WebDAV functionality being invoked.

Figure 3:
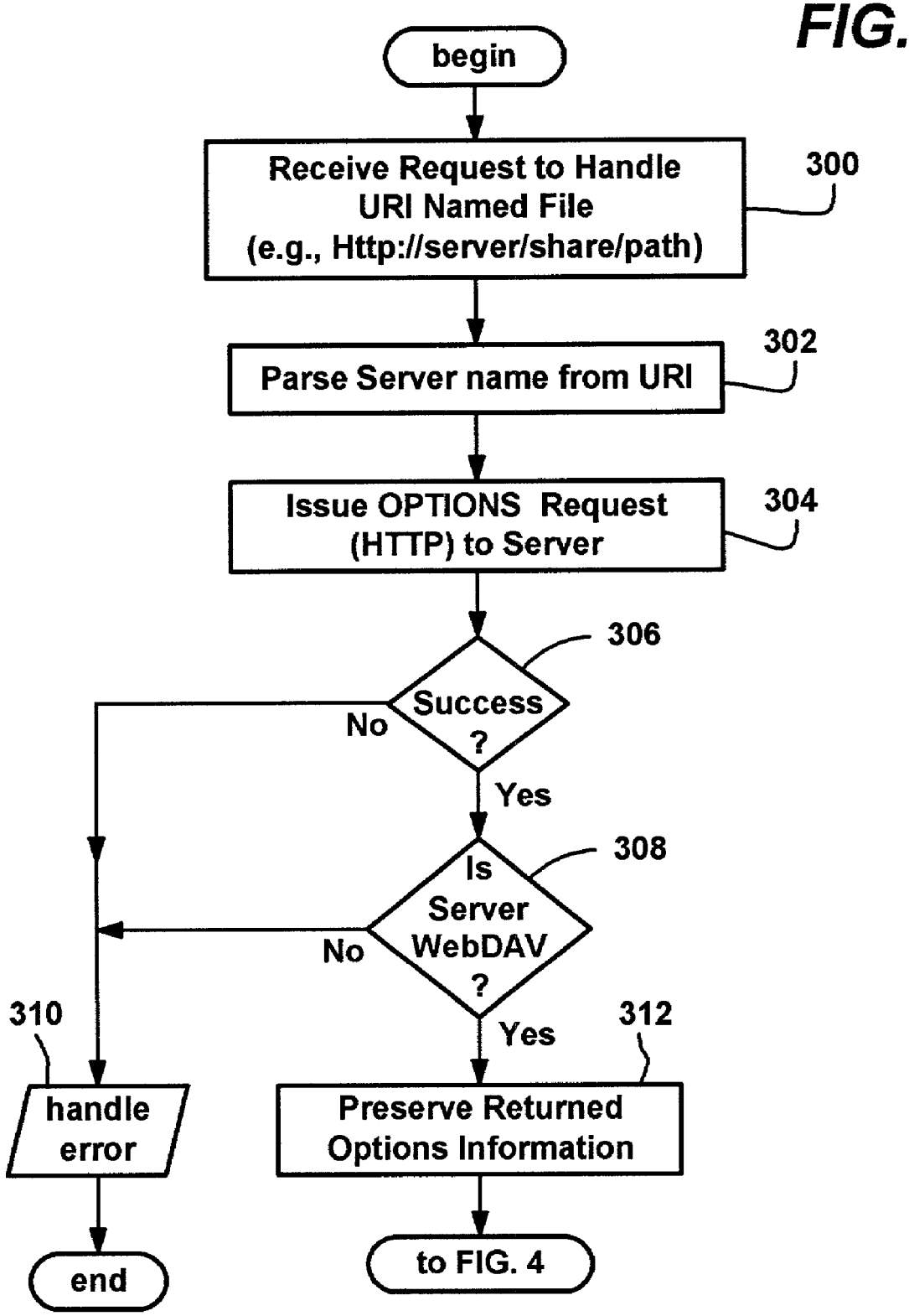
FIGS. 3 and 4 comprise a flow diagram generally representing logic for accessing a WebDAV server file in accordance with an aspect of the present invention.

Turning to an explanation of the operation of the invention, as generally represented in the flow diagrams of FIGS. 3-7, when needed, the kernel mode WebDAV redirector 212 operates to determine whether it can handle a given URI, by first contacting the named server with an HTTP "OPTIONS" request. For example, this may be in response to a File I/O Create/Open-type request that arrives as an IRP, or as part of a browser-like request to display a server's shared folders that is received from the WebDAV network provider, as described above. To determine whether the WebDAV redirector can handle the request, the WebDAV kernel mode redirector 212 contacts the user mode WebDAV redirector component 214 to issue the HTTP OPTIONS call to the identified remote server via its server name (parsed from the URI) via the Internet transport component 220 (e.g., WinInet). This is generally represented in FIG. 3, by steps 300, 302 and 304.

One possibility is that the remote server does not respond to the OPTIONS request, (e.g., it times out or something unreadable comes back), while another possibility is that the remote server responds but it is not a WebDAV server, which is determinable from the information returned in the response to the OPTIONS request. Steps 306 and 308 represent the handling of these possibilities, with step 310 representing the error handling. For example, if the MUP 206 is polling the WebDAV kernel mode redirector 212, in a described implementation, the error handling may simply comprise responding to the MUP 206 with an errorcode or the like indicating that it cannot handle the particular path. If the operation was initiated by the MPR 228 calling the WebDAV network provider 214 which in turn contacted the WebDAV kernel mode redirector 212 to find out if it could handle the URI, the WebDAV kernel mode redirector 212 can respond negatively to the WebDAV network provider 214 to handle appropriately. Note that although not necessary, it is possible to handle a timeout failure at step 306 by retrying it (return to step 304) some number of times before considering the operation a failure.

If at steps 306 and 308 the server responds with information indicating that the server is a WebDAV server, step 312 is executed, which represents preserving any relevant information returned in the response to the HTTP OPTIONS request, e.g., a list of the capabilities of the server. At this time, FIG. 3, step 312 continues to step 400 of FIG. 4, as appropriate.

Figure 4:
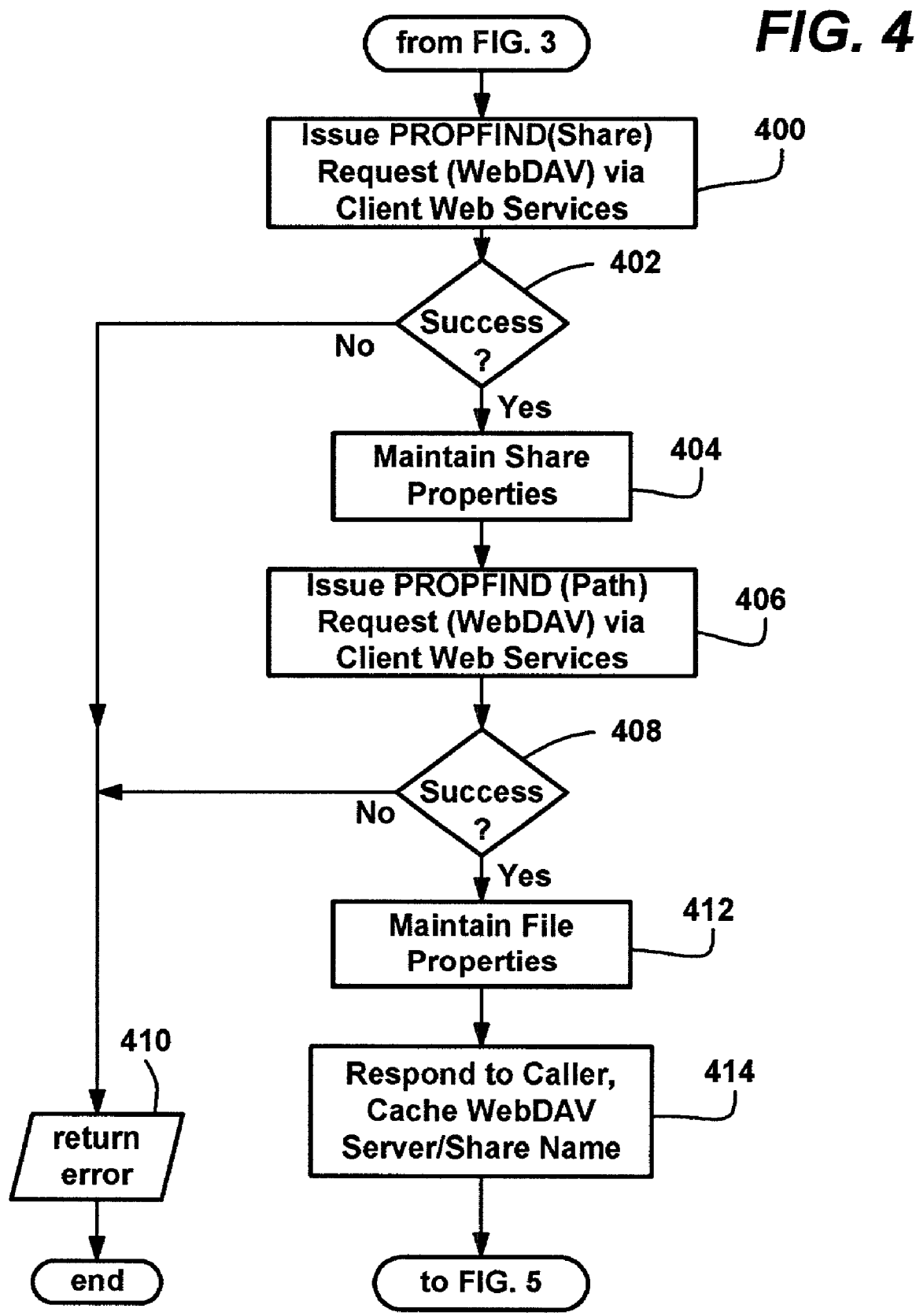
Figure 5:
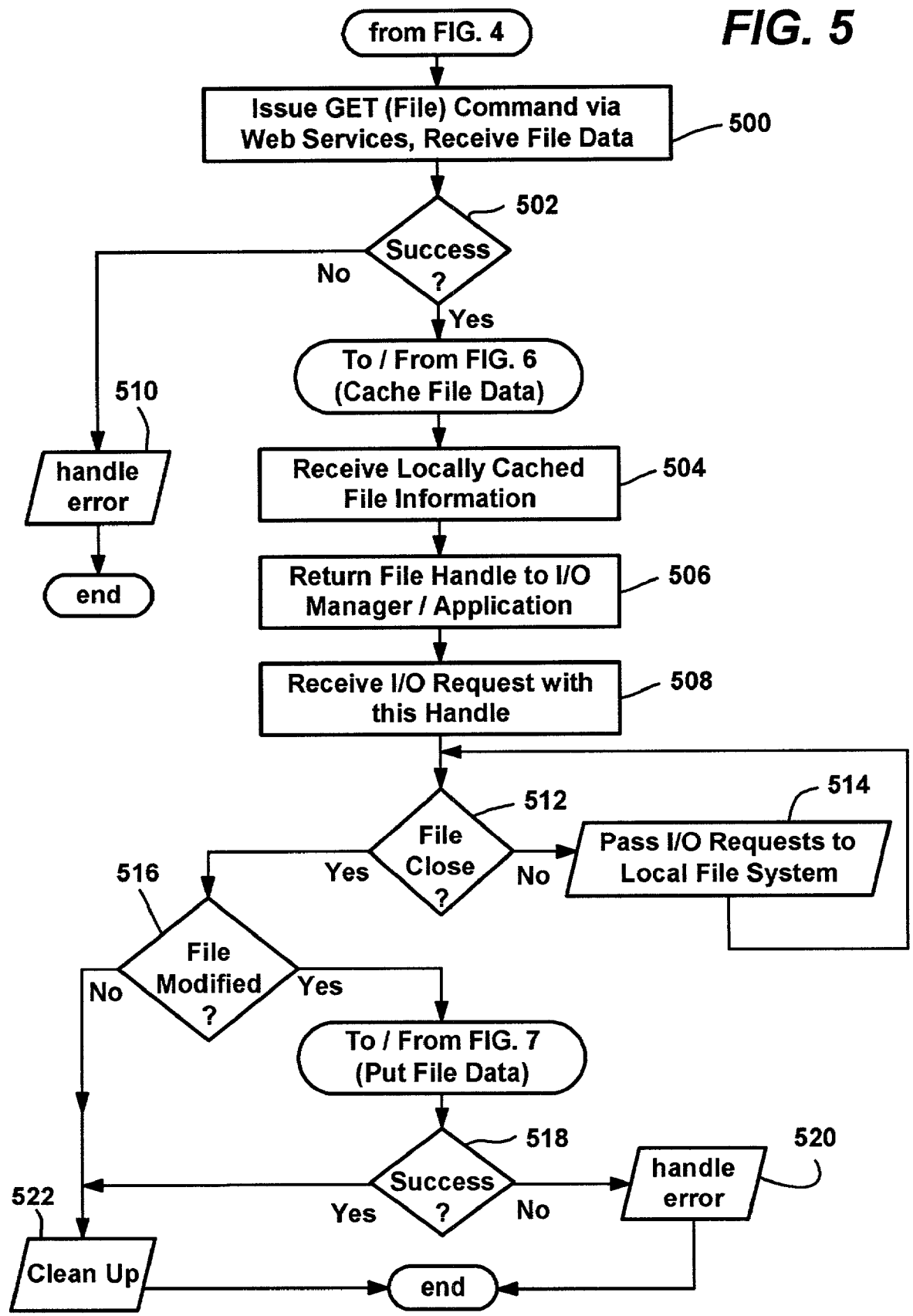
FIG. 5 is a flow diagram generally representing logic for downloading a WebDAV server file for local access in accordance with an aspect of the present invention.

FIGS. 4 and 5 represent an example of what takes place when a URI is requested for a URI that specifies a server, share and path, e.g., in a file I/O request to open/create a file on a WebDAV server. It should be noted that the network provider 216 may not be requesting such information, but instead, for example, may be simply requesting an enumeration of the shares of a WebDAV server, in which event a specific share and path may not be present. Similarly, the request may be for the enumeration of the files on a share, in which event a specific file will not be identified for creating/opening. Thus, for example, the network provider may respond to the MPR that it handles this URI, whereby the server name and share or shares may be cached for later use, with the requesting application given the appropriate result. Such enumerations and the like (e.g., mapping drives, making implicit connections) are relatively straightforward, however, and thus for simplicity the examples below will focus on opening, reading and writing a WebDAV stored file accessed via a file I/O operation.

At step 400 of FIG. 4, once the server is known to support WebDAV, the process attempts to obtain the properties of the share identified in the URI via a WebDAV PROPFIND request that identifies the share. Note that as described above, this is accomplished via the user mode redirector component 214 (which, for example regularly polls to obtain web service-directed requests when readied by the kernel mode component) and the Internet transport component 220. Step 402 represents evaluating whether the PROPFIND request was successful. For example, the PROPFIND request may result in the server responding with an error (e.g., if the requested share does not exist) or the PROPFIND request may time out without a response. If the PROPFIND request fails, error handling is represented at step 410, which, as is understood, may vary in what is appropriate. For example, a negative response to the MUP or MPR may suffice, as described above. In other circumstances, such as the server being a WebDAV share but the particular requested share being non-existent, a response that ultimately informs the application that the specified share is not found would be appropriate. Of course, it is possible to retry any timeout error or the like as desired before considering it a failure.

In the event that the share's properties are returned, they are preserved in a file control block or the like at step 404. For example, as described below, one of the properties may indicate that the shared folder is encrypted, which the system needs to know so that any newly created file in that folder will be stored in encrypted form on the WebDAV server. File control blocks are well known data structures for maintaining information in association with a file system's objects, and are thus not described herein for purposes of simplicity.

If successful at step 402, and following step 404, step 406 is executed to issue a PROPFIND request on the identified path to obtain the file properties, e.g., via the user mode redirector component 214. If the file exists and no other error (e.g., no response) occurred as determined by step 408, step 412 is executed to place the file properties in the file control block. At this time, the kernel mode redirector component 212 responds with a success, e.g., to the MUP 206, with information that causes the MUP to cache the "Server/Share" part of the URI, as discussed above. It should be noted that some or all the WebDAV requests can be accomplished in a single PROPFIND request specifying the path. Similarly, the "Server/Share" part of the URI may be cached following a successful PROPFIND(share) operation. However, in a preferred implementation, separately issuing an OPTIONS request, a PROPFIND(share) request and then a PROPFIND (path) request has been found to provide the desired overall results for various actual circumstances.

Once the file is known to exist and its properties have been retrieved, FIG. 5, step 500 is executed to issue a "GET" request to retrieve the file to local storage. One way that this can be accomplished is to have the user mode WebDAV redirector component 214 instruct the Internet transport component 220 to cache the file upon receipt. For example, with WinInet functionality, a private, per-user and/or hidden cache 240 can be specified in advance (e.g., logically separate from other local file system and Internet cached files 240). When the file data is received, the Internet transport component 220 will cache the retrieved file data via the local file system 244 (e.g., NTFS, which may correspond to the file system 135 of FIG. 1) to that specified location 240, rather than, for example, to a regular folder or the cache used for normal Internet content retrieval.

For purposes of simplicity, the present invention will be primarily described with respect to the entire file being downloaded as a whole via a GET request (step 500), and later written back to the WebDAV server as a whole via a PUT request when the application closes the file. Notwithstanding, READ RANGE and other extensions are well-understood alternatives for downloading file data. Moreover, although WRITE RANGE requests are not presently implemented in WebDAV, it is understood that writing the file back in ranges, rather than as a whole, is also a practical alternative.

By way of examples, instead of (or in addition to) issuing a GET request, one ore more READ RANGE requests may be specified. This would allow some file data to be received without awaiting downloading of the entire file, which may provide a more satisfying user experience, particularly with very large files and/or a low bandwidth connection. For example, with an existing file, since the application's file open request is typically followed by a read request, a separate READ RANGE request could make available at least some (e.g., the first part) of the likely-requested data to the application without waiting for the GET request to complete. Alternatively, multiple READ RANGE requests could be sent to download the file data. As is understood, if used, READ RANGE requests may be made on demand when data is needed and/or in anticipation of data to be read. However, as is also understood, if the application is allowed to write to the file, then any written (dirtied) portions of the file cannot be allowed to be overwritten with incoming data or the writes would be lost. To this end, such dirtied portions would have to be tracked, such as via a bitmap, with the data kept by either not writing changes to the file until the GET request or READ RANGE request to the dirtied region completes, or by preventing downloaded data from overwriting dirtied regions.

Returning to FIG. 5, step 500 represents the GET request being issued to read the entire file's data. If not successful, the request can be retried some number of times before being considered an error, but once an error is determined, it is handled at step 510, such as by returning a suitable errorcode to the application in response to the failed file create/open API request.

Figure 6:
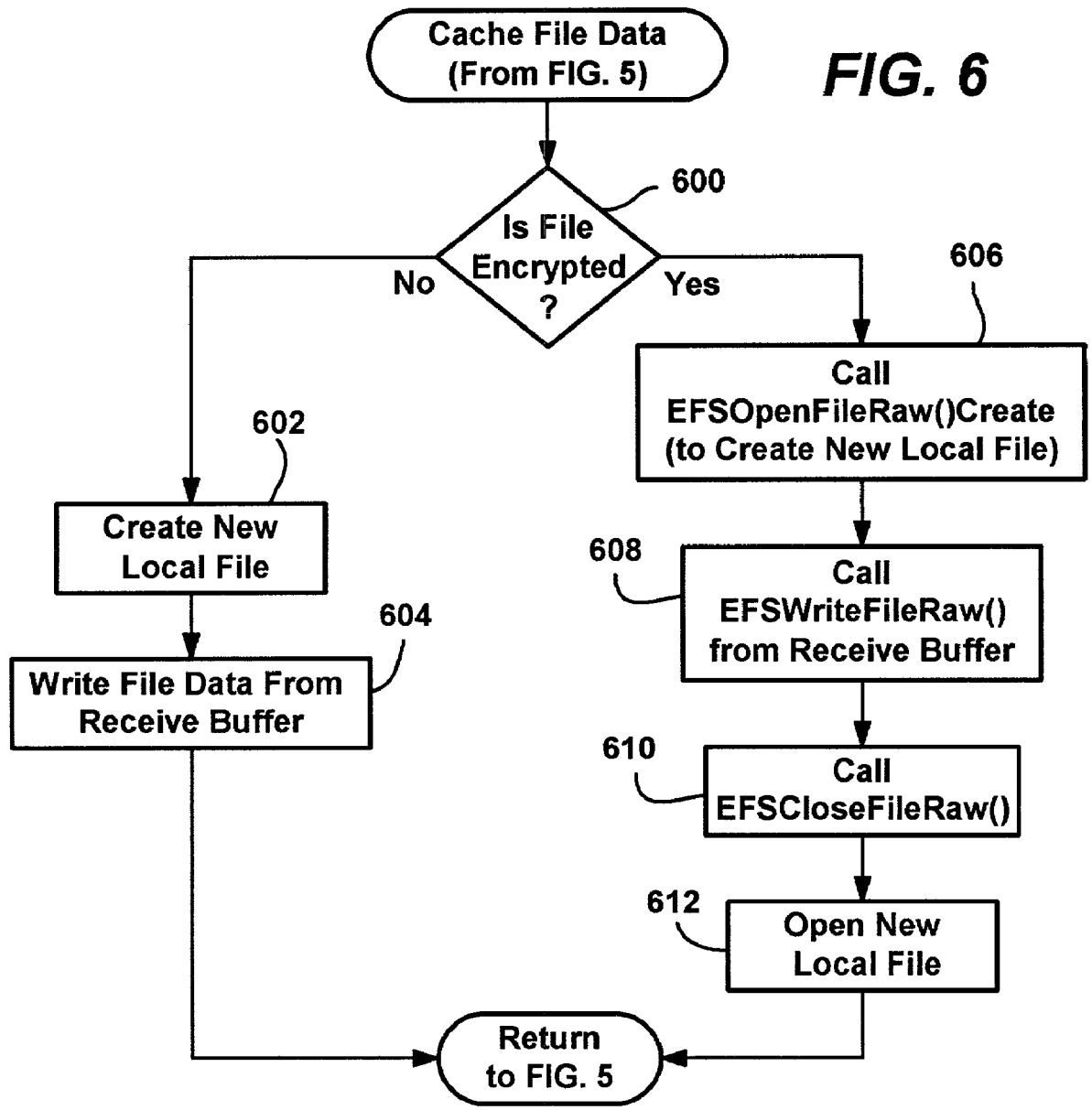
FIG. 6 is a flow diagram generally representing logic for caching a WebDAV server file for local access in accordance with an aspect of the present invention.

The process continues to step 600 of FIG. 6, which represents caching of the downloaded data. At step 600, a decision is made as to whether the downloaded file is encrypted, as described below. This can be done by checking file attribute information, and/or by using an encrypting file system function that evaluates the data of any file and determines whether it is encrypted by the encrypting file system. The encrypting file system is described below with respect to FIG. 8.

For purposes of the present example, at this time, the file will not be considered as encrypted, and thus step 600 branches to step 602 which opens (creates) a file on the local file system, e.g., in a hidden, private WebDAV cache 240, and step 604 writes the file data (e.g., from the buffers of the Internet transport 220) to the file in the cache 240. The process then returns to FIG. 5, step 504, to return the file handle and so on to the application, and thus the file may be left open at this time.

Once locally cached, the locally cached file information (e.g., a file handle returned by the file system 244) is made available to the WebDAV redirector components 210, as represented by step 504. Step 506 represents the returning of this handle to the I/O manager 204, which provides the handle to the application 200 via the API response. Note that the file handle (identifier) given to the WebDAV components 210 by the NTFS file system 240 is not the same file handle that the WebDAV kernel mode redirector 212 returns to the I/O manager 204, but rather one created to correspond to it. In any event, the WebDAV kernel mode redirector 212 knows the file handle that the application 200 has, whereby as described below, the WebDAV kernel mode redirector 212 can detect when this file handle is closed and thereafter put the file back on the WebDAV server 218.

Some time after the file is open, the application uses this file handle in a file I/O request (e.g., a read or write) sent to the I/O manager 204 via a file I/O API, as represented by step 508.

As is known, as a result of this I/O-related API call, an IRP corresponding to this request is received by the WebDAV kernel mode redirector 212, which is in the driver stack. The WebDAV kernel mode redirector 212 recognizes the file handle, and (e.g., if the file is not being closed at step 512) generally satisfies the request by simply passing the IRP through to the file system driver 244 at step 514, translating the handle value in the IRP to the handle of the cached file, if it was changed. In other words, since in the present example the entire file is present on the local storage 240 until the file is closed, any file I/O requests (in the form of IRPs) to read or write to that file as identified by the handle are passed through the WebDAV kernel mode redirector 212 to the file system driver 244, adjusting the file handle as necessary. In this manner, reads and writes are to the local file copy via the file system 244, keeping this aspect of the kernel mode redirector 212 simple.

Eventually, the application 200 will request closing of the file, as detected by step 512, which then branches to step 516. Note that for efficiency, the kernel mode redirector 212 can track whether at least one write request or other (e.g., property) change occurred, so that if not (whereby the file did not possibly change), via step 516, the identical file need not be put back on the WebDAV server 218. However, if modified as detected at step 516, to preserve the file on the WebDAV server 218, at the time of file close, the kernel mode redirector 212 will issue a PUT request to upload the file content to the WebDAV server 218, via the user mode redirector 214 and Internet transport component 220.

Figure 7:
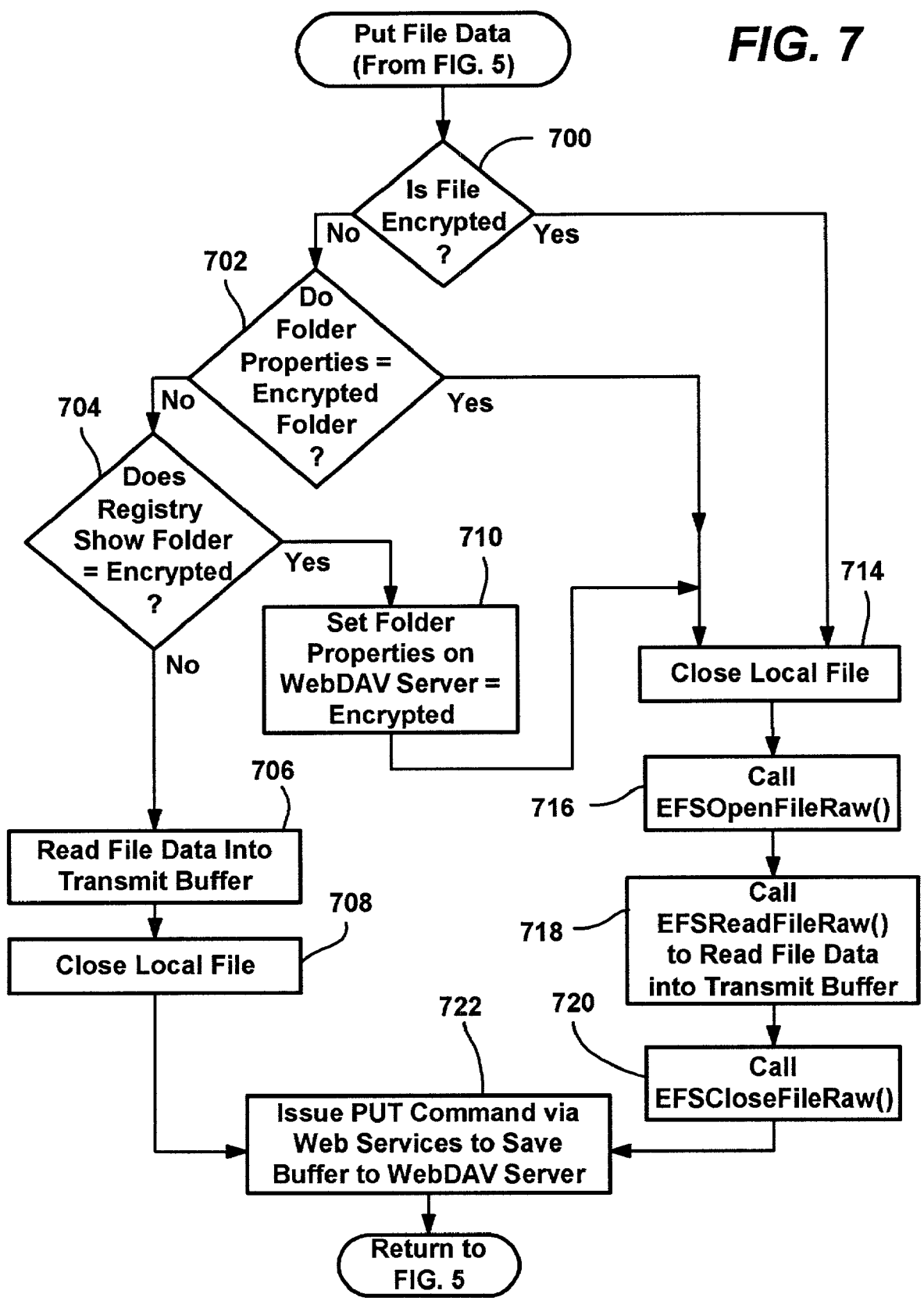
FIG. 7 is a flow diagram generally representing logic for uploading a locally cached file to a WebDAV server in accordance with an aspect of the present invention.

FIG. 7 represents the PUT request that uploads the file to the server. Steps 700, 702 and 704 are directed to testing for whether the file is encrypted, as described below. Since in the present example at this time the file is not encrypted, steps 706 and 708 represent the transferring of the file contents to a transmit buffer (e.g., of the Internet transport 220) or the like that holds the request object body property, and the closing of the local file once reading is complete.

Step 722 represents the issuing of the "PUT" request to upload the file to the WebDAV server 218. As with other communications, this is accomplished via the user mode WebDAV redirector component 214 web services in conjunction with the Internet transport 220. Step 722 then returns to step 518 of FIG. 5.

Step 518 of FIG. 5 represents testing whether the PUT request was successful. If the PUT is not successful, the WebDAV kernel mode redirector 212 can take action at step 520 to ensure that any changes are not lost. For example, the WebDAV kernel mode redirector 212 can preserve information (e.g., to the registry) indicating the locally cached file's location and other relevant information, so that the WebDAV kernel mode redirector 212 can later write the file to the WebDAV server, such as when connectivity thereto is restored. So that the file data is not temporarily lost, the WebDAV kernel mode redirector 212 can also reopen such an unwritten local copy when requested, instead of the WebDAV copy, until the WebDAV kernel mode redirector 212 is able to successfully upload the local copy to the WebDAV server and resume normal operation.

If the PUT request is successful at step 518, (or if the file was not modified at step 516), then step 522 is executed to perform any clean-up operations or the like. In this manner, from the application's perspective, the data is transparently transferred to and from a WebDAV server 218 like any other stored file. Note however that the local file is preferably not deleted, but is maintained locally (as least for some time) in the event the user decides to again open the file, e.g., relatively soon. In this way, the cached file can be used (if it has not been modified) instead of requiring a GET request to download the file from the server.

It should be noted that security is handled by the Internet transport, e.g., the WinInet APIs, which handles the authentication with the server. This includes Passport Authentication. As is known, Microsoft® Passport is an online service that provides users with secure access to multiple, Passport-enabled Web sites and services using only an e-mail address and a single password.

In the above manner, existing applications can obtain the benefit of WebDAV file access in a manner that is essentially transparent from the applications' user mode perspective. As a result, applications simply work with a WebDAV file as if it was on a local drive or SMB network drive. However, because WebDAV is a file access protocol that travels over HTTP, WebDAV runs over the existing Internet infrastructure (e.g., through firewalls and routers), providing access to files from essentially any Internet-connected location.

Encrypted WebDAV Files

In known prior network storage solutions, a file may have an access control list (ACL) associated therewith, whereby only users having rights to a file may access it. However, this assumes a secure file system such as NTFS and trusted system administrators, which outside of a controlled corporate network or the like, (such as with WebDAV), may not be the actual situation. Further, even with ACLs, network administrators have access to the files, and while this may be acceptable to closed corporate environments, there are no safe assumptions that can be made as to how carefully outside storage providers will store a client's data, e.g., on what file system, how securely from hackers, or who will have administrator rights.

Prior network storage solutions dealt with some of these issues by encrypting the file data on its storage medium, and then when retrieved, decrypting the data and sending it in an unencrypted format to the receiver, who might then re-encrypt the file. Even though the unencrypted file data can be sent securely with another protocol, such a system has inherent problems. One such problem is the load on the server, e.g., if the server supports many clients and has to encrypt and decrypt each incoming and outgoing transaction, performance is significantly decreased. Another problem is that the server has to be able to decrypt files stored on its system, whereby compromising the server compromises the data.

In accordance with another aspect of the invention, Web-DAV files may be locally encrypted and decrypted at the file system level, transparent to applications and the WebDAV server. Since with WebDAV files can be arranged in any format, the local client can encrypt the files locally, into a set of binary bits that are unreadable without a key, which the server is never given, whereby the files cannot be decrypted at the server. As a result, since the server never receives the data in unencrypted form, clients can keep confidential information on the server without worrying about it being viewed, regardless of how it is stored and who has access to it. Moreover, since with an encrypted file the WebDAV server simply receives or sends an already encrypted file, the server does not have to do any additional encryption or decryption work to attempt to protect the data.

To provide such locally transparent encryption and decryption for WebDAV files, the kernel mode redirector component 212 leverages the Encrypting File System (EFS) technology provided with the NTFS file system. As described in U.S. Pat. No. 6,249,866, hereby incorporated by reference herein, EFS automatically encrypts and decrypts file data at the file system level using a public key-private key pair encryption scheme. Files may be marked (e.g., by the user) as encrypted, or entire folders may be marked as encrypted, in which event any files in that folder are stored in encrypted form. Note that at present, EFS only works with the NTFS file system. The kernel mode WebDAV redirector component 212 can check where it is putting the file to make sure that it is under the NTFS file system.

Figure 8:
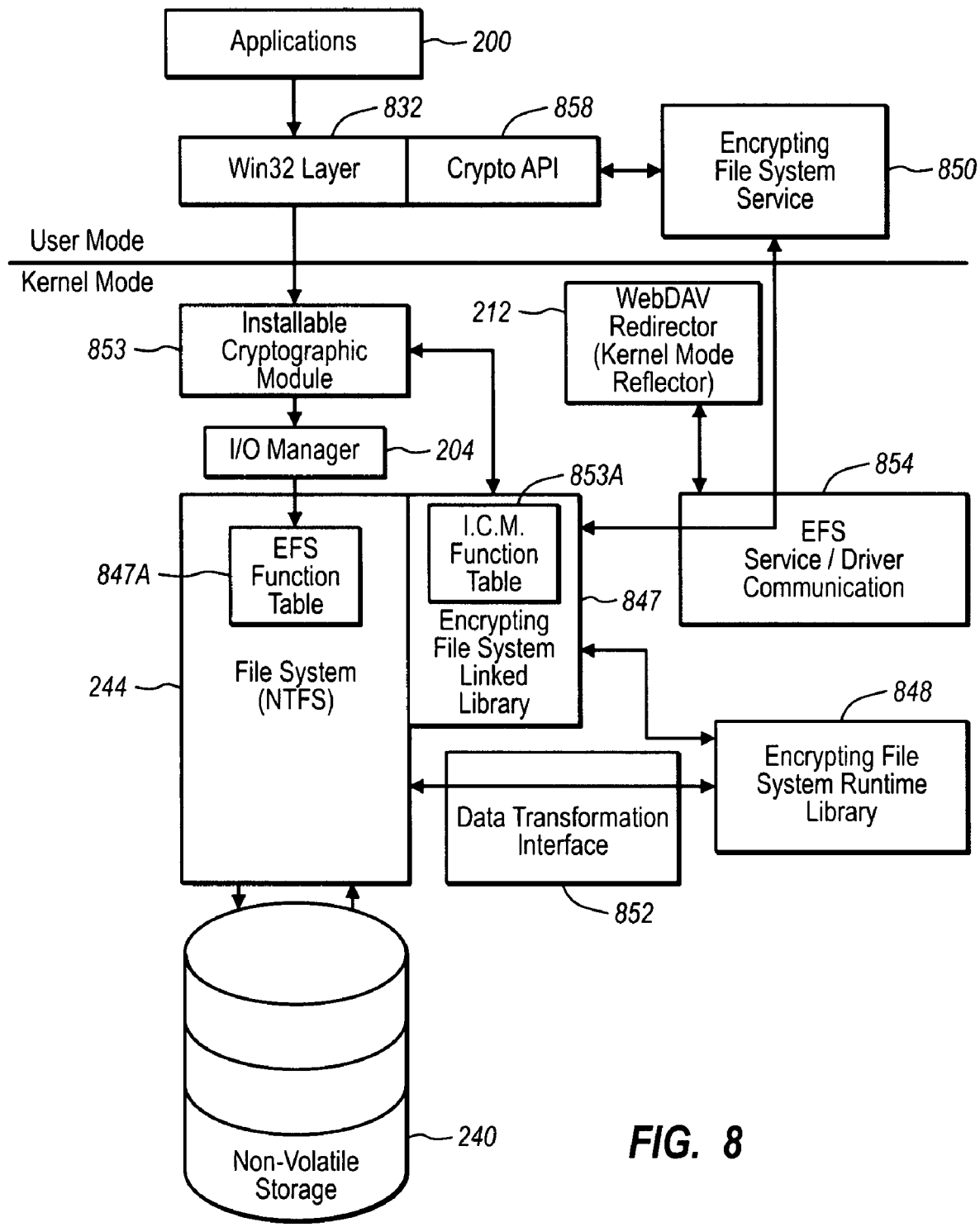
FIG. 8 is a block diagram generally representing components for integrating WebDAV files with an encrypting file system in accordance with another aspect of the present invention.

In general, EFS operates as generally represented in FIG. 8, in one implementation comprising an Encrypting File System (EFS) linked library 847, (e.g., DLL), an EFS runtime library (FSRTL) 848 and an EFS service 850. The EFS linked library 847 registers with the file system 244, whereby the file system provides encryption functionality that is transparent (e.g., to an application) by calling the EFS linked library's functions, listed in a function table $847_A$ or the like acquired by the file system during registration.

During initialization, the EFS linked library 847 registers file system runtime library callback routines (FSRTL 848 routines) with the NTFS 244, maintained in the function table $847_A$. As described below, NTFS 244 uses these FSRTL 848 routines to call back to obtain file encryption related services. The EFS linked library 847 provides the support to communicate with the user mode EFS service 850 running, as part of the security subsystem. During initialization (or alternatively when encryption or decryption is first needed), the EFS linked library 847 communicates with the EFS service 850 using a GenerateSessionKey interface, to establish a symmetric session key that is used to communicate securely between the EFS linked library 847 and the EFS service 850. Data communicated between the two is encrypted using this session key. This session key is also used by callouts to the FSRTL 848 to decrypt I/O controls from the EFS service 850. During open of an encrypted file, the EFS linked library 847 communicates with the EFS service 850 by passing it the file metadata, including data decryption and data recovery fields that are maintained within EFS-encrypted files, to get back the file encryption key and any updates to the file metadata. The file metadata may be updated because the user may change to a new key, or the recovery agent's keys might get updated. The EFS linked library 847 passes this information to FSRTL 848.

During encryption of a plaintext file/directory or creation of a new encrypted file, the EFS linked library 847 communicates with the EFS service 850 to get a new file encryption key, and encryption metadata for the encrypted file. The EFS linked library 847 also passes this information to the FSRTL 848.

The FSRTL 848 is a module that implements NTFS callouts to handle various file system 244 operations such as reads, writes, and opens, on encrypted files and directories, as well as operations to encrypt, decrypt, and recover file data when it is written to or read from disk. To this end, the present invention provides a callout mechanism including an interface between NTFS 244 and the FSRTL 848. This interface is generic to any appropriate library (and driver) that transform data, including the ones described herein that encrypt data, and thus the interface between NTFS 244 and FSRTL 848 is more accurately referred to as a data transformation interface 852.

Operations between the EFS linked library 847 and FSRTL 848 include writing EFS attribute data (decryption data and recovery fields) as file attributes, and communicating a file encryption key computed in the EFS service 850 to FSRTL 848, such that it can be set up in the context of an open file. This file context is then used for transparent encryption and decryption on writes and reads of file data to and from the non-volatile storage 240.

The data transformation interface 852 interfaces the EFS linked library 847 to the file system 244 for accomplishing data encryption. The EFS linked library 847 registers these callbacks with the file system 244, whereby the file system 244 uses the registered EFS callback functions at appropriate times to carry out the various encrypting and decrypting tasks that the user requests. The data transformation interface 852 includes a number of function pointers, or callbacks. A first callback which the file system 244 uses, the FileCreate callback, tells the registered EFS functions that a stream is being created or opened.

When an application opens or creates a file, the I/O subsystem including the I/O manager 204 determines the file is of a certain file system, e.g., an NTFS file, and passes the request on to NTFS 244. NTFS 244 determines whether EFS may be interested in the file, e.g., if the file is created in an encrypted directory or if a stream is created or attached to an encrypted file. IF NTFS 244 determines that the file is of interest to EFS, and sees that the EFS linked library 847 is registered therewith, NTFS 244 calls a registered EFS function, i.e., the FileCreate callback. If the request is a file open request on an existing file, FSRTL 848 reads the file metadata from the file attribute and fills up a context block, previously allocated by the EFS linked library 847 to pass back that information to the EFS linked library 847. When the call returns from NTFS 244, the EFS linked library 847 takes the metadata information and communicates with the EFS service 850 to extract a file encryption key from the metadata. This information is then returned by the EFS linked library 847 to NTFS 244 by another FSRTL 848 interface, FileControl, described below, which sets up a key context on the file being opened. This key context is thereafter retained by NTFS 244 for future calls to the EFS linked library 847 until the file is closed. If the file metadata is updated, the updated metadata is also re-written to the attributes by the registered EFS functions through NTFS callbacks.

If a new file is created, the FileCreate call results in the FSRTL 848 filling up the context buffer $98_1$ with a request for a new file encryption key and metadata. The FSRTL 848 then passes the context buffer $98_1$ back to the EFS linked library 847. The EFS linked library 847 takes this information and communicates with the EFS service 850 to obtain a new file encryption key and new file metadata from the EFS service 850. Using a file control callback, the EFS linked library 847 returns this information to the FSRTL 848, whereby, using NtOfs function calls, the FSRTL 848 sets up the key context 98 on the file being created and writes the file metadata. The NtOfs API is a set of NTFS 244 function calls that allow the EFS linked library 847 to call into the file system 244 to manipulate the data streams containing the encryption metadata.

Another callback, FileSystemControl_1, is called by NTFS 244 in response to the EFS linked library 847 request when a user is setting the encryption state of a file (EFS_SET_ENCRYPT), either marking it as encrypted or decrypted. In response, NTFS 244 sets or clears the encryption bit, and the EFS linked library 847 generates any necessary key storage. EFS_SET_ENCRYPT also originates in the EFS service 850 when a plaintext file begins to be encrypted, whereby the file state is modified such that no other operations are allowed on the file until the encryption is completed.

NTFS 244 also calls the FileSystemControl_2 interface with various encryption driver-specific file control requests from the EFS linked library 847. Note that NTFS 244 takes no action with these callbacks other than to simply pass the call to the FSRTL 848. The file control requests include EFS_SET_ATTRIBUTE, which comes from the EFS filter EFS linked library 847 when it wants to write new or updated file metadata, and EFS_GET_ATTRIBUTE, which may come from the EFS linked library 847 or a user mode application 30 to query the file metadata. The information includes the list of user public keys and recovery agent public keys that may be used to encrypt the file encryption key. Another request, EFS_DECRYPT_BEGIN, comes from the EFS service 850 when it starts decrypting an encrypted file. In response, the state of the file is modified such that no other operations are allowed on the file until the decryption is completed. EFS_DEL_ATTRIBUTE is a request originating in the EFS service 850 when it finishes decrypting an entire encrypted file, and wants to delete the file metadata and associated attribute. The EFS_ENCRYPT_DONE request also comes from the EFS service 850 when it successfully completes the file encryption. The file state is modified to allow any operations from this point on. EFS_OVERWRITE_ATTRIBUTE comes from the EFS service 850 when an encryption file is restored from its backup format. The EFS service 850 supplies the file metadata that needs to overwrite any existing metadata on the file. This request is also associated with the deletion of any key context 96 associated with that file, such that no reads or writes can proceed while the file is being restored.

The FileSystemControl_2 interface is also called by the file system 244 in response to the FSCTL_ENCRYPTION_FSCTL_IO, also described below. This provides a means for the EFS linked library 847 to have NTFS 244 call the EFS linked library 847 (itself), such as when NTFS 244 recognizes that a file is in a certain state corresponding to a state for which the EFS linked library 847 is waiting.

The file system 244 directly uses the callback, AfterReadProcess after it has read some data from the disk for an encrypted file, and before returning it to the user. The AfterReadProcess function decrypts the data on the fly in response to this callback. Conversely, BeforeWriteProcess is called by the file system 244 before it writes some data to the disk for an encrypted file. The function encrypts the data as a result of this callback.

The EFS service 850 also provides support for Win32 APIs 32, which are programming interfaces for encrypt, decrypt, recover and provide support for importing and exporting encrypted files. Importing and exporting encrypted files allows users to convert the files into opaque data (encrypted) for operations such as backup, restore, and general file transfer purposes, including WebDAV, as described below. The Win32 APIs 32 provide programming interfaces for encrypting plain text files, decrypting or recovering ciphertext files, and importing and exporting encrypted files (without decrypting them first).

As generally described above, in addition to transparent encryption and decryption of file data at the file system level, EFS can thus encrypt files that were not previously encrypted, add user keys to a file, change any other basic EFS information about an encrypted file, such as the type of encryption used, and perform other functions.

In accordance with one aspect of the present invention, when a file is already encrypted on a WebDAV server, the file can be transferred in encrypted form to the client, locally decrypted for reading, have changes made thereto, and put back on the client and the server in encrypted form. However, because EFS will transparently decrypt reads and encrypt writes at the file system level, the file cannot simply be opened and read to upload it, otherwise the data would not be transmitted in its encrypted form. Similarly, if an encrypted file is downloaded, a file to hold the data cannot simply be created locally and written to, since EFS would attempt to encrypt already-encrypted data when it wrote the data to the local file.

To this end, when uploading an encrypted file, a file image that corresponds to how it appears when stored locally in encrypted form is sent, including EFS information included in the file that is necessary to later decrypt it. Similarly, when downloading an already-encrypted file, the file is written to local storage as an image that corresponds to how it was originally written to the server, i.e., as an encrypted file.

In one implementation, to transfer the data back and forth, the file image is sent using certain functions, namely EFSOpenFileRaw( ), EFSReadFileRaw( ), EFSWriteFileRaw( ), and EFSCloseFileRaw( ) APIs. In essence, this essentially bypasses the encryption or decryption operations by EFS on the file data, whereby the file is transferred as a block of "raw" bits.

More particularly, the EFSOpenRawFile( ) function (API) allows the user to open an encrypted file without read access, and without setting up a file encryption key to do transparent reads and writes. For these operations, NTFS 244 recognizes the access level and does not call the encryption EFS linked library 847 to look up a key for this file, nor o decrypt reads nor encrypt writes. The only operations allowed on a file opened via this interface are file controls. Thus, an EFSReadRawFile( ) API allows the user to read the data from the file, including the encryption metadata, as a contiguous opaque stream, which can then be sent to the WebDAV server. The EFSWriteRawFile( ) API allows the user to write a contiguous opaque stream received from a WebDAV server to an NTFS disk volume, including the encryption metadata of an encrypted file.

FIG. 6 shows this logic for an encrypted file, as determined by a file attribute or by an EFS function at step 600. If a downloaded file is encrypted, step 600 branches to step 606 which opens a local file on the cache 240 for a raw data write. More particularly, if the data is already encrypted on the server, then it is already in the proper format, with encryption metadata (e.g., such as the encrypted key information) included in the file content. Thus, the cached file needs to be an image of the file on the server, and encryption should not again be attempted on this file. At step 608, an EFS WriteRawFile( ) API interface allows the received data to be written to the local cache storage 240 from a specified source, such as the Internet transport's receive buffer, without any encryption and other EFS interpretation being performed. Once this is done, the locally cached file appears as it does on the WebDAV server. At step 610, a function EFSCloseRawFile( ) is called to close the file which was opened raw by OpenRawFile.

At this time, the downloaded file is maintained in local storage like any other encrypted file. Step 612 opens this file in the normal manner, whereby EFS will now automatically decrypt reads and encrypt writes as the file is accessed with I/O commands, in a manner that is transparent to other higher level components, including the application. Thus, steps 504-514 act as described above with respect to non-encrypted files.

Once the file is closed however, it needs to be put back on the WebDAV server 218 in its encrypted form. Again, note that the WebDAV server 218 has no idea of the format and content of the file, as it is simply storing a named collection of bits. Locally, however, the file will not be decrypted when read into the transport's buffers or the like for the PUT operation, and thus the EFS needs to read the raw bits into the buffers as an image of the entire encrypted file, not just the decrypted data portion thereof.

Step 700 of FIG. 7 determines whether the file is marked as encrypted. If not, it is possible that the directory is marked as encrypted, whereby the file will need to be encrypted as well. Step 702 checks for this possibility. If not, it is possible that the directory is intended to be encrypted, but has been changed at the WebDAV server, whereby step 704 checks a registry setting or the like that tracks which WebDAV folders should be encrypted. If the registry setting indicates that this particular WebDAV folder should be encrypted, but for some reason was not at step 702, then step 704 branches to step 710 to reset the WebDAV folder properties to reflect that the folder is encrypted. Note that steps 702, 704 and 710 can be done at other times, not just at file uploads, to ensure that encrypted folders remain that way, and/or that the files under those folders are encrypted.

If the folder is encrypted but the file is not, the file is closed at step 714, as described below. Note that the file inside the encrypted WebDAV folder is not encrypted at this time, but will remain unencrypted until accessed through the WebDAV redirector. In other words, if a file is not encrypted (which means it was created before the folder was marked encrypted), it will remain unencrypted even if it is modified. Only if a new file is created in an encrypted folder is that file created encrypted.

At step 714, the encrypted local file is closed, and reopened at step 716 for copying it raw to the WebDAV server. As described above, the raw copying is accomplished by having NTFS open files with the EFSOpenFileRaw( ) API at step 716, read the file raw (as an opaque stream) via the EFSReadFileRaw( ) API into the appropriate buffer for transmitting the file to the WebDAV server at step 718, and then close the file via the EFSCloseFileRaw( ) API at step 720. The file is uploaded to the WebDAV server at step 722 as described above. In this manner, the WebDAV server stores an image of an encrypted file as is, without any EFS decryption done before uploading. Since the server file cannot be decrypted without a user or recovery agent's private key, which a WebDAV server administrator would not (typically) possess, the server file data remains private, as long as the set of private keys that can open the file is secure. Moreover, the type of file system storage on the WebDAV server is unimportant, since even if the file system is not secure, an encrypted file cannot be viewed in plaintext.

In accordance with another aspect of the present invention, support for other EFS APIs is provided. For example, a previously non-encrypted WebDAV file may be set as encrypted, a user or recovery agent's key may be added to a file, or other basic EFS information about the file may be changed. In general, such operations are performed locally, with the file transferred back and forth using the EFSOpenFileRaw( ), EFSReadFileRaw( ), EFSWriteFileRaw( ), and EFSCloseFileRaw( ) APIs.

To this end, when called, EFS determines whether a file is on a network share, and what the UNC name of that file is. EFS APIs will try to detect the WebDAV path by using WNet APIs or the like, e.g., GetDriveType( ) and WNetGetResourceInformation( ). For example in a Windows® XP environment, EFS will use GetDriveType ( ) to detect a remote path. When the remote path is obtained, EFS checks whether the path corresponds to a WebDAV path by using WNetGetProviderName( ) and WNetGetResourceInformation( ). If so, via a remote procedure call, EFS provides the UNC name to the local EFS server. If the path is not a WebDAV path, EFS provides the UNC name to the remote EFS server where the file exists.

The EFS server uses the UNC name where a local name is used in the current code, i.e., the EFS server is using the WebDAV UNC name as if it was the local name. This causes WebDAV kernel mode redirector 212 to intercept and redirect EFS FSCTLs to the local NTFS 244.

The kernel mode WebDAV redirector 212 also looks for calls to NtQueryVolumeInformation( ) on a WebDAV handle to return information about the client. Note that if there is not enough space on the server, WebDAV will return an error in a separate path without EFS being aware of it. When the EFS API finishes the jobs, WebDAV will uses the EFSOpenFileRaw( ), EFSReadFileRaw( ) and EFSCloseFileRaw( ) APIs to move the modified file back to the WebDAV server, as described above.

As can be seen from the foregoing detailed description, there is provided a method and system that transparently provide access to WebDAV files. The method and system provide file I/O functionality and networking (e.g., browsing) functionality as if the file was on a local file system volume instead of at a WebDAV server. Moreover, the present invention enables browsers and the like to access WebDAV stored files via networking APIs. As a result, file sharing across the Internet (through firewalls, routers, and so forth) via WebDAV servers is provided, which cannot be achieved with network file servers. The method and system work with files that are encrypted such that the WebDAV server only sees files in their encrypted form and has no key to decrypt the files.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network, a method of automatically and transparently handling WebDAV server and file access requests, the method comprising:
   maintaining at an I/O manager a predetermined, stored priority order that indicates which of a plurality of redirectors has precedence to handle a WebDAV I/O request, wherein a plurality of suitably configured redirectors respond to the WebDAV I/O request, each redirector being equally capable of redirecting the received WebDAV I/O request;
   receiving at the I/O manager the WebDAV I/O request initiated from an application program, wherein the WebDAV I/O request indicates a path and filename of a remote file accessible via WebDAV;
   polling available redirectors to determine which redirectors are configured to handle the application program's WebDAV I/O file request, each redirector suitably configured to handle the WebDAV I/O request including appropriate functionality for receiving and redirecting WebDAV I/O file requests to corresponding WebDAV server computer systems that store the remote files;
   receiving responses from the plurality of suitably configured redirectors, each suitably configured redirector being equally capable of redirecting the received WebDAV I/O file request;
   determining from the stored priority order which of the plurality of suitably configured redirectors has precedence to handle the WebDAV I/O file request;
   based on the determination, requesting a local file system of the redirector determined to have precedence to create the file in response to the WebDAV I/O file request, downloading the file to a local cache of the redirector's file system, and returning a file handle corresponding to the file in the local cache to the application program;
   providing access to the file in the local cache of the file system via the file handle;
   receiving a request to close the file via the file handle, and when received, uploading the file from the local cache of the file system to the WebDAV server;
   determining that the redirector determined to have precedence is configured to handle all similar WebDAV I/O requests to a network share; and
   bypassing any redirector polling for subsequent requests directed to the network share.

2. The method of claim 1 wherein receiving an I/O request initiated from an application program comprises, receiving a Universal Resource Identifier corresponding to a file on the WebDAV server.

3. The method of claim 1 wherein receiving an I/O request initiated from an application program comprises, receiving a filename and an identifier previously mapped to a share on the WebDAV server.

4. The method of claim 1 wherein polling available redirectors to determine which redirectors are configured to handle the application program's I/O request comprises, issuing an HTTP OPTIONS request, and evaluating a response therefrom.

5. The method of claim 1 wherein polling available redirectors to determine which redirectors are configured to handle the application program's I/O request comprises, issuing a WebDAV PROPFIND request directed to a share on the WebDAV server, and evaluating a response therefrom.

6. The method of claim 5 wherein the WebDAV server returns property information in response to the WebDAV PROPFIND request directed to the share, and further comprising, maintaining the property information in a local data structure.

7. The method of claim 1 wherein polling available redirectors to determine which redirectors are configured to handle the application program's I/O request comprises, issuing a WebDAV PROPFIND request directed to the file on the WebDAV server, and evaluating a response therefrom.

8. The method of claim 7 wherein the WebDAV server returns property information in response to the WebDAV PROPFIND request directed to the file, and further comprising, maintaining the property information in a local data structure.

9. The method of claim 1 wherein polling available redirectors to determine which redirectors are configured to handle the application program's I/O request, comprises:
   a) issuing an HTTP OPTIONS request, evaluating a corresponding response, and determining that the server is a WebDAV server;
   b) issuing a WebDAV PROPFIND request directed to a share on the WebDAV server, evaluating a corresponding response, and determining that the share exists on the WebDAV server, the response including share property information; and
   c) issuing a WebDAV PROPFIND request directed to the file, evaluating a corresponding response, and determining that the file exists, the response including file property information.

10. The method of claim 9 further comprising, maintaining the share property information and the file property information in at least one local data structure.

11. The method of claim 1 wherein polling available redirectors to determine which redirectors are configured to handle the application program's I/O request, and further comprising, communicating with at least one other local component to indicate that at least this request can be handled.

12. The method of claim 1 further comprising, determining that the file is encrypted on the WebDAV server, and wherein downloading the file to a local cache of the file system comprises, communicating with the file system to create an image of the file in the local cache that is also encrypted.

13. The method of claim 12 further comprising, communicating with the file system to open the image of the file such that the file system will transparently decrypt file data on read requests and will transparently encrypt file data on write requests to the file.

14. The method of claim 12 wherein uploading the file from the local cache of the file system to the WebDAV server comprises, communicating with the file system to read data from the local image of the file such that the file will be uploaded as the encrypted image thereof.

15. A recordable computer-readable storage medium having computer-executable instructions for performing the method of claim 1.

16. The method of claim 1, wherein the priority order is based on server type.

17. The method of claim 16, wherein a different priority order is stored for each server type.

18. A computer-implemented method of automatically and transparently handling WebDAV server and file access requests, the method comprising:
   maintaining at a local application programming interface layer a predetermined, stored priority order that indicates which of a plurality of redirectors has precedence to handle a WebDAV I/O request, wherein a plurality of suitably configured redirectors respond to the WebDAV I/O request, each redirector being equally capable of redirecting the received WebDAV I/O request;
   receiving at the local application programming interface layer a WebDAV application I/O request comprising a WebDAV Uniform Resource Identifier (URI) indicating a path and filename of a remote file accessible via WebDAV;
   polling available redirectors to determine which redirectors are configured to handle the WebDAV URI, each redirector suitably configured to handle the WebDAV application I/O request including appropriate functionality for receiving and redirecting WebDAV URI requests to corresponding WebDAV server computer systems that store the remote files;
   receiving responses from the plurality of suitably configured redirectors, each suitably configured redirector being equally capable of redirecting the received WebDAV URI request;
   determining from the stored priority order which of the plurality of responding redirectors has precedence to handle the WebDAV I/O URI request;
   determining that the specified share and file are accessible;
   based on the determination, handling the request, including:
      requesting a local file system of the redirector determined to have precedence to create the file in response to the WebDAV I/O URI request;
      downloading the file to a local cache of the redirector's file system; and
      returning a file handle corresponding to the file in the local cache to the WebDAV application program;
   determining that the redirector determined to have precedence is configured to handle all similar WebDAV I/O requests to a network share; and
   bypassing any redirector polling for subsequent requests directed to the network share.

19. The method of claim 18 wherein the application request includes the Universal Resource Identifier.

20. The method of claim 18 wherein the application request includes an identifier that has been previously mapped to at least part of the Universal Resource Identifier.

21. The method of claim 18 wherein the application request comprises an I/O request directed to a file, and wherein handling the request comprises creating a local file corresponding to the I/O request.

22. The method of claim 21 wherein handling the request further comprises, downloading at least some file data from the WebDAV server to the local file.

23. The method of claim 21 wherein handling the request further comprises, returning a file handle corresponding to the local file to the application.

24. The method of claim 18 wherein the application request comprises a networking request to browse a network share on the WebDAV server, and wherein handling the request includes enumerating information of the network share.

25. The method of claim 18 wherein the application program's request indicates a share on the WebDAV server, and further comprising, issuing a WebDAV PROPFIND request directed to the share on the WebDAV server.

26. The method of claim 25 wherein the application program's request further indicates a file on the share on the WebDAV server, and further comprising, issuing a WebDAV PROPFIND request directed to the file.

27. The method of claim 18 wherein the application request comprises an I/O request directed to an encrypted file, and further comprising, automatically decrypting the data locally when downloading the encrypted file from the WebDAV server and automatically encrypting the data locally when uploading the encrypted file to the WebDAV server.

28. The method of claim 18 wherein the application request comprises an I/O request directed to a file that is encrypted on the WebDAV server, and wherein handling the request comprises, creating a local file corresponding to the I/O request, and downloading an image of the file on the WebDAV server to the local file, wherein the local file is written by a local file system such that the image corresponds to the encrypted image on the WebDAV server.

29. The method of claim 28 further comprising, communicating with the file system to open the local file such that the file system will transparently decrypt file data read on read requests and will transparently encrypt file data written on write requests.

30. The method of claim 29 further comprising, detecting a request to close the local file, closing the local file, communicating with the files system to open the local file such that the file will not be decrypted when read, and uploading the file to the WebDAV server as an encrypted file.

31. A recordable computer-readable storage medium having computer-executable instructions for performing the method of claim 18.

32. In a computer network, a system including a processor and a memory for automatically and transparently handling WebDAV server and file access requests, the system comprising:
   an application program that issues WebDAV-related requests, including at least one request having a WebDAV Uniform Resource Identifier (URI) corresponding to path and filename of a remote file stored on a WebDAV server;
   a WebDAV redirector, the WebDAV redirector configured to respond to polls used to determine which redirectors are configured to handle the application's WebDAV-related request, each redirector being suitably configured to handle the WebDAV I/O request including appropriate functionality for receiving and redirecting WebDAV I/O file requests to corresponding WebDAV server computer systems that store the remote files;

an I/O manager configured to perform the following:
maintain a predetermined, stored priority order that indicates which of a plurality of redirectors has precedence to handle a WebDAV I/O request, wherein the plurality of suitably configured redirectors respond to the WebDAV I/O request, each redirector being equally capable of redirecting the received WebDAV I/O file request, and that receives responses from the plurality of suitably configured redirectors;

determine from the stored priority order which of the plurality of suitably configured redirectors has precedence to handle the WebDAV I/O request and indicating that the WebDAV red irector locally handling each request corresponding to the WebDAV server can be handled locally and was determined to have precedence to create the file in response to the WebDAV I/O request, and communicate with the WebDAV server to handle requests that cannot be handled locally;

determine that the redirector determined to have precedence is configured to handle all similar WebDAV I/O requests to a network share; and bypass any redirector polling for subseauent requests directed to the network share.

33. The system of claim 32 wherein the identifier corresponding to a WebDAV server issued by the application comprises a Universal Resource Identifier.

34. The system of claim 32 wherein the identifier corresponding to a WebDAV server issued by the application comprises an identifier previously mapped to a share on the WebDAV server.

35. The system of claim 32 wherein the WebDAV redirector receives requests from the application via an application programming interface.

36. The system of claim 32 wherein the application program issues I/O requests directed to a WebDAV file, and wherein the WebDAV redirector receives the 110 requests from a manager component.

37. The system of claim 32 wherein the application program issues I/O requests directed to a WebDAV file, and wherein the WebDAV redirector:
a) creates a local representation of the file;
b) determines whether the file exists on the WebDAV server, and if so, downloads at least some of the data from the WebDAV server file to the local representation of the file;
c) returns a file handle corresponding to the local representation of the file to the application program;
d) receives I/O read and write requests associated with the file handle and handles the I/O read and write requests via the local representation of the file; and
e) receives an I/O close request associated with the file handle, and handles the I/O close request by closing the local representation of the file and uploading at least part of the local representation of the file to the WebDAV server.

38. The system of claim 37 wherein the WebDAV file is encrypted, and wherein WebDAV redirector creates the local representation of the file by:
a) requesting the file system to create a local file that is opened such that transparent encryption and decryption are not enabled therefor,
b) downloading at least some of the encrypted file data by requesting the file system to write to the local file without translation thereof, and
c) requesting the file system to close the local file.

39. The system of claim 38 wherein the WebDAV redirector handles I/O read and write requests from the application by requesting the file system to reopen the local file such that reads therefrom are decrypted and writes thereto are encrypted.

40. The system of claim 39 wherein when the WebDAV redirector handles the I/O close request, and before uploading the file, the WebDAV redirector closes the local representation of the file, and reopens the local file by requesting the file system to open the file such that reads therefrom are not decrypted.

* * * * *